US012611770B2

(12) United States Patent
Lian et al.

(10) Patent No.: US 12,611,770 B2
(45) Date of Patent: Apr. 28, 2026

(54) CATEGORY-LEVEL MANIPULATION FROM VISUAL DEMONSTRATION

(71) Applicant: Intrinsic Innovation LLC, Mountain View, CA (US)

(72) Inventors: Wenzhao Lian, Fremont, CA (US); Bowen Wen, Bellevue, WA (US); Stefan Schaal, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 172 days.

(21) Appl. No.: 18/103,256

(22) Filed: Jan. 30, 2023

(65) Prior Publication Data

US 2023/0241773 A1      Aug. 3, 2023

Related U.S. Application Data

(60) Provisional application No. 63/304,533, filed on Jan. 28, 2022.

(51) Int. Cl.
| | |
|---|---|
| *B25J 9/16* | (2006.01) |
| *G05B 19/4155* | (2006.01) |
| *G06N 3/08* | (2023.01) |
| *G06V 10/82* | (2022.01) |
| *G06V 20/40* | (2022.01) |

(52) U.S. Cl.
CPC ............. *B25J 9/1664* (2013.01); *B25J 9/163* (2013.01); *G05B 19/4155* (2013.01); *G06N 3/08* (2013.01); *G06V 10/82* (2022.01); *G06V 20/41* (2022.01); *G05B 2219/50391* (2013.01)

(58) Field of Classification Search
None
See application file for complete search history.

(56) References Cited

U.S. PATENT DOCUMENTS

| | | | | |
|---|---|---|---|---|
| 11,507,826 | B2 * | 11/2022 | Rohanimanesh | ...... G06N 3/088 |
| 12,175,703 | B2 * | 12/2024 | Birchfield | ............ G06V 10/255 |
| 2005/0107919 | A1 | 5/2005 | Watanabe et al. | |
| 2018/0250826 | A1 * | 9/2018 | Jiang | ...................... G06V 10/25 |
| 2022/0277472 | A1 * | 9/2022 | Birchfield | ................. G06T 7/73 |

(Continued)

OTHER PUBLICATIONS

Andrychowicz et al., "Learning dexterous in-hand manipulation," The International Journal of Robotics Research, 2020, 39 (1):3-20.

(Continued)

*Primary Examiner* — Ryan Rink
(74) *Attorney, Agent, or Firm* — Fish & Richardson P.C.

(57) ABSTRACT

Methods, systems, and apparatus, including computer programs encoded on computer storage media, for robotic control using demonstrations to learn category-level manipulation task. One of the methods includes obtaining a collection of object models for a plurality of different types of objects belonging to a same object category and training a category-level representation in a category-level space from the collection of object models. A category-level trajectory is generated the demonstration data of a demonstration object. For a new object in the object category, a trajectory projection is generated in the category-level space, which is used to cause a robot to perform the robotic manipulation task on the new object.

19 Claims, 4 Drawing Sheets

(56) References Cited

U.S. PATENT DOCUMENTS

| | | | | |
|---|---|---|---|---|
| 2022/0402128 | A1* | 12/2022 | Lian | B25J 9/1661 |
| 2023/0130281 | A1* | 4/2023 | Brown | G06N 3/04 |
| | | | | 345/420 |
| 2023/0145208 | A1* | 5/2023 | Bobu | G06N 20/00 |
| | | | | 706/12 |
| 2024/0005547 | A1* | 1/2024 | Lin | G06T 7/70 |
| 2024/0371082 | A1* | 11/2024 | Goyal | C10G 11/02 |

OTHER PUBLICATIONS

Bechtle et al., "Learning Extended Body Schemas from Visual Keypoints for Object Manipulation," CoRR, Submitted on Nov. 8, 2020, arXiv:2011.03882, 7 pages.

Byravan et al., "Se3-pose-nets: Structured deep dynamics models for visuomotor control," CoRR, Submitted on Oct. 2, 2017, arXiv:1710.00489v1, 8 pages.

Chai et al., "Multistep pick-and-place tasks using object-centric dense correspondences," In 2019 IEEE/RSJ International Conference on Intelligent Robots and Systems (IROS), 2019, pp. 4004-4011.

Coumans et al., "PyBullet, a Python module for physics simulation for games, robotics and machine learning," 2016-2021.

Deng et al., "PoseRBPF: A Rao-Blackwellized Particle Filter for 6-D Object Pose Tracking," CoRR, Submitted on May 22, 2019, arXiv:1905.09304v1, 10 pages.

Ebert et al., "Visual foresight: Model-based deep reinforcement learning for vision-based robotic control," CoRR, Submitted on Dec. 3, 2018, arXiv:1812.00568v1, 14 pages.

Florence et al., "Dense object nets: Learning dense visual object descriptors by and for robotic manipulation," CoRR, Submitted on Sep. 7, 2018, 12 pages.

Gao et al., "kPAM 2.0: Feedback Control for Category-Level Robotic Manipulation," IEEE Robotics and Automation Letters, Apr. 2021, 6(2):2962-2969.

International Preliminary Report on Patentability in International Appln. No. PCT/US2023/011884, mailed on Aug. 8, 2024, 7 pages.

International Search Report and Written Opinion in International Appln. No. PCT/US2023/011884, mailed on May 8, 2023, 9 pages.

Kappler et al., "Real-time perception meets reactive motion generation," IEEE Robotics and Automation Letters, Jul. 2018, 3(3):1864-1871.

Levine et al. "Learning hand-eye coordination for robotic grasping with deep learning and large-scale data collection," The International Journal of Robotics Research, 2018, 37(45):421-436.

Levine et al., "End-to-end training of deep visuomotor policies," CoRR, Submitted on Apr. 19, 2016, arXiv:1504.00702v5, 40 pages.

Mandlekar et al., "Learning to generalize across long-horizon tasks from human demonstrations," CoRR, Submitted on Mar. 13, 2020, arXiv:2003.06085v1, 11 pages.

Manuelli et al., "Keypoint affordances for category-level robotic manipulation," CoRR, Submitted on Oct. 29, 2019, arXiv:1903.06684v2, 26 pages.

Manuelli et al., "Keypoints into the Future: Self-Supervised Correspondence in Model-Based Reinforcement Learning," CoRR, Submitted on Sep. 10, 2020, arXiv:2009.05085v1, 17 pages.

Mitash et al., "Task-Driven Perception and Manipulation for Constrained Placement of Unknown Objects," CoRR, Submitted on Jun. 28, 2020, arXiv:2006.15503v1, 8 pages.

Morgan et al., "Vision-driven Compliant Manipulation for Reliable, High-Precision Assembly Tasks," CoRR, Submitted on Jun. 26, 2021, arXiv:2106.14070v1, 13 pages.

Qi et al., "PointNet: Deep learning on point sets for 3D classification and segmentation," CoRR, Submitted on Apr. 10, 2017, arXiv:1612.00593v2, 19 pages.

Qin et al., "KETO: Learning keypoint representations for tool manipulation," 2020 IEEE International Conference on Robotics and Automation (ICRA), May 31, 2020, pp. 7278-7285.

Sieb et al., "Graph-structured visual imitation," Proceedings of the Conference on Robot Learning, PMLR, 2020, 11 pages.

Simeonov et al., "Neural Descriptor Fields: SE (3)-Equivariant Object Representations for Manipulation," CoRR, Submitted on Dec. 9, 2021, arXiv:2112.05124, 9 pages.

Tobin et al., "Domain randomization for transferring deep neural networks from simulation to the real world," CoRR, Submitted on Mar. 20, 2017, arXiv:1703.06907v1, 8 pages.

Umeyama, "Least-squares estimation of transformation parameters between two point patterns," IEEE Computer Architecture Letters, 1991, 13(04):376-380.

Vecerik et al., "S3K: Self-Supervised Semantic Keypoints for Robotic Manipulation via Multi-View Consistency," CoRR, Submitted on Oct. 13, 2020, arXiv:2009.14711v2, 11 pages.

Viereck et al., "Learning a visuomotor controller for real world robotic grasping using simulated depth images," Proceedings of the 1st Annual Conference on Robot Learning, PMLR, 2017, 10 pages.

Wang et al., "6-PACK: Category-level 6D Pose Tracker with Anchor-Based Keypoints," 2020 IEEE International Conference on Robotics and Automation (ICRA), May 31, 2020, pp. 10059-10066.

Wang et al., "Normalized object coordinate space for category-level 6D object pose and size estimation," In Proceedings of the IEEE/CVF Conference on Computer Vision and Pattern Recognition, 2019, 2642-2651.

Wen et al., "BundleTrack: 6D Pose Tracking for Novel Objects without Instance or Category-Level 3D Models," CoRR, Submitted on Aug. 1, 2021, arXiv:2108.00516v1, 8 pages.

Wen et al., "CaTGrasp: Learning Category-Level Task-Relevant Grasping in Clutter from Simulation," CoRR, Submitted on Sep. 19, 2021, arXiv:2109.09163v1, 8 pages.

Wen et al., "Robust, occlusion-aware pose estimation for objects grasped by adaptive hands," CoRR, Submitted on March, 7, 2020, arXiv:2003.03518v1, 8 pages.

Wen et al., "se(3)-TrackNet: Data-driven 6D Pose Tracking by Calibrating Image Residuals in Synthetic Domains," 2020 IEEE/RSJ International Conference on Intelligent Robots and Systems (IROS), Oct. 24, 2020, pp. 10367-10373.

Yang et al., "Learning Multi-Object Dense Descriptor for Autonomous Goal-Conditioned Grasping," IEEE Robotics and Automation Letters, 2021, 6(2):4109-4116.

* cited by examiner

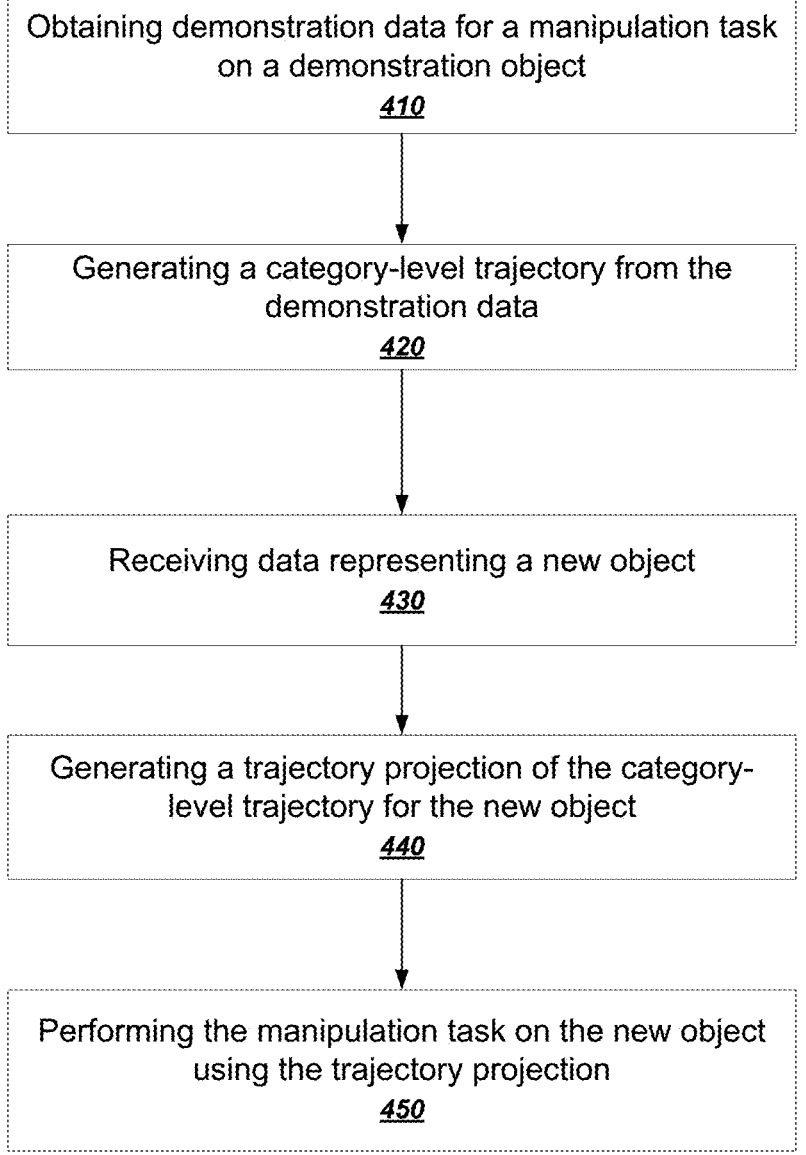

Obtaining demonstration data for a manipulation task
on a demonstration object
*410*

Generating a category-level trajectory from the
demonstration data
*420*

Receiving data representing a new object
*430*

Generating a trajectory projection of the category-
level trajectory for the new object
*440*

Performing the manipulation task on the new object
using the trajectory projection
*450*

FIG. 4

CATEGORY-LEVEL MANIPULATION FROM VISUAL DEMONSTRATION

CROSS-REFERENCE TO RELATED APPLICATION

This application claims priority to U.S. Provisional Application No. 63/304,533, filed on Jan. 28, 2022. The disclosure of the prior application is considered part of and is incorporated by reference in the disclosure of this application.

BACKGROUND

This specification relates to robotics, and more particularly to planning robotic movements.

Robotics control refers to controlling the physical movements of robots in order to perform tasks. Robotic manipulation tasks require a robotic component, e.g., an end effector, to physically contact an object to effectuate some change in the object. For example, an industrial robot that builds cars can be programmed to first pick up a car part and then weld the car part onto the frame of the car.

Implementing robotic manipulation tasks has traditionally required immense amounts of manual programming in order to meticulously dictate how the robotic components should move in order to accomplish a particular task. For example, picking up a car part, moving it into place, and performing a weld can require hundreds or thousands of precise individual movements by robot motors and actuators. Manual programming is tedious, time-consuming, error prone, and not generalizable. In other words, a robotic plan manually generated for one workcell can generally not be used for other workcells or tasks.

Some research has been conducted toward using machine learning control algorithms, e.g., reinforcement learning, to control robots to perform particular tasks. However, robots have a number of drawbacks that make traditional learning approaches generally unsatisfactory.

First, robots naturally have a very complex, high-dimensional, and continuous action space. Thus, it is computationally expensive to generate and evaluate all possible candidate actions. Secondly, robotic control is an environment with extremely sparse rewards because most possible actions do not result in completing a particular task. This is especially true for very complex tasks.

An additional complication is that traditional techniques for using machine learning for robotic control are extremely brittle. This means that even if a workable model is successfully trained, even very tiny changes to the task, the robot, or the environment can cause the entire model to become completely unusable. To adapt a previously trained model to a new task typically requires additional collection of data, many hours or weeks of retraining, and possibly human alterations to the model itself.

Therefore, trained manipulation tasks are generally unusable even for similar objects in the same category.

SUMMARY

This specification describes technologies relating to one-shot, category-level demonstration-based robotic control. In particular, the specification describes how a robotic system can learn a robotic manipulation skill from a single demonstration that uses a demonstration object. The system can then generalize the learned manipulation skill so that the manipulation task can also be also successfully performed on other objects in the same object category. Notably, the system can learn the manipulation skill from a single demonstration and generalize the manipulation skill to other objects without collecting any additional data, without requiring human labeling, and without retraining a model. In this specification, a manipulation skill is a collection of software and data that provides a robotic system with the capability to successfully perform a manipulation task. Typically a manipulation skill includes the capability to grasp and object and place the object in another location, which can require an interaction with other objects. For example, connector insertion requires inserting a jack into a plug and battery installation often requires interacting with a spring in a particular way.

These technologies are particularly advantageous for performing robotic tasks that are traditionally difficult to control using machine learning, e.g., reinforcement learning. These tasks include those involving physical contact with objects in a work space, for example, sanding, connection and insertion tasks, and wire routing, to name just a few examples.

Particular embodiments of the subject matter described in this specification can be implemented so as to realize one or more of the following advantages. The techniques described in this specification allow a robotic control system to learn a truly generalizable category-level manipulation skill. In addition, the skill can be learned in a one-shot fashion from a single demonstration, which can be easily generated from conventional video capture.

The manipulation skill can be learned without human annotations. The manipulation skill can also be a high level task that is significantly more complex than mere pick and place manipulation tasks. The manipulation skill can be learned from digital object models, e.g., CAD models, without requiring any real-world data collection in a workcell. Instead, massive amounts of training data can be collected by simply crawling publicly available sources, e.g., the Internet.

The category-level manipulation skill also requires only a single demonstration object in order to be generalizable to many other types of objects in the same category. This means that the manipulation skill can be performed on new objects that have never been seen by the system.

In addition, the category-level manipulation skill can be performed on a new object without any adjustments to the model. In other words, the manipulation skill can be performed on a new object in the category without adjusting the model, without collecting additional data, without collecting human annotations, and without retraining.

Moreover, the manipulation skill can be applied to a new object even when the data describing the new object is incomplete or noisy. For example, the system can use the manipulation skill on an incomplete point cloud of the object, which can be rapidly obtained using a 3D camera. This ability to utilize incomplete and noisy data makes the system far more robust than systems that use manually specified keypoints. And the ability to operate on incomplete or noisy data means that it is unnecessary to acquire a fully specified CAD model of the new object.

In addition, the techniques described below are far more robust than reinforcement based learning approaches. The modular design of the manipulation skills allows the system to use other path planning algorithms for some parts of the task, which means that the system does not need to incur the massive training times required for adapting a reinforcement learning policy. In addition, the modular design makes the skill generalizable to different environments and task configurations.

Furthermore, the techniques described below are particularly well-suited for contact-rich tasks in which parts of the manipulation task are intended to make contact. Such contact-rich tasks are difficult to learn for reinforcement learning systems.

The techniques described in this specification can also use visual feedback to guide the manipulation of new objects without retraining, without a CAD model for the new object, and without or data collection.

The single demonstration requirement enables human operators to teach the robot manipulation strategies at minimal cost. This convenience allows humans to easily transfer prior knowledge and domain expertise to the robot.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart of an example process for using a demonstration to teach a robot how to manipulate all objects in a category.

DETAILED DESCRIPTION

Figure 1:
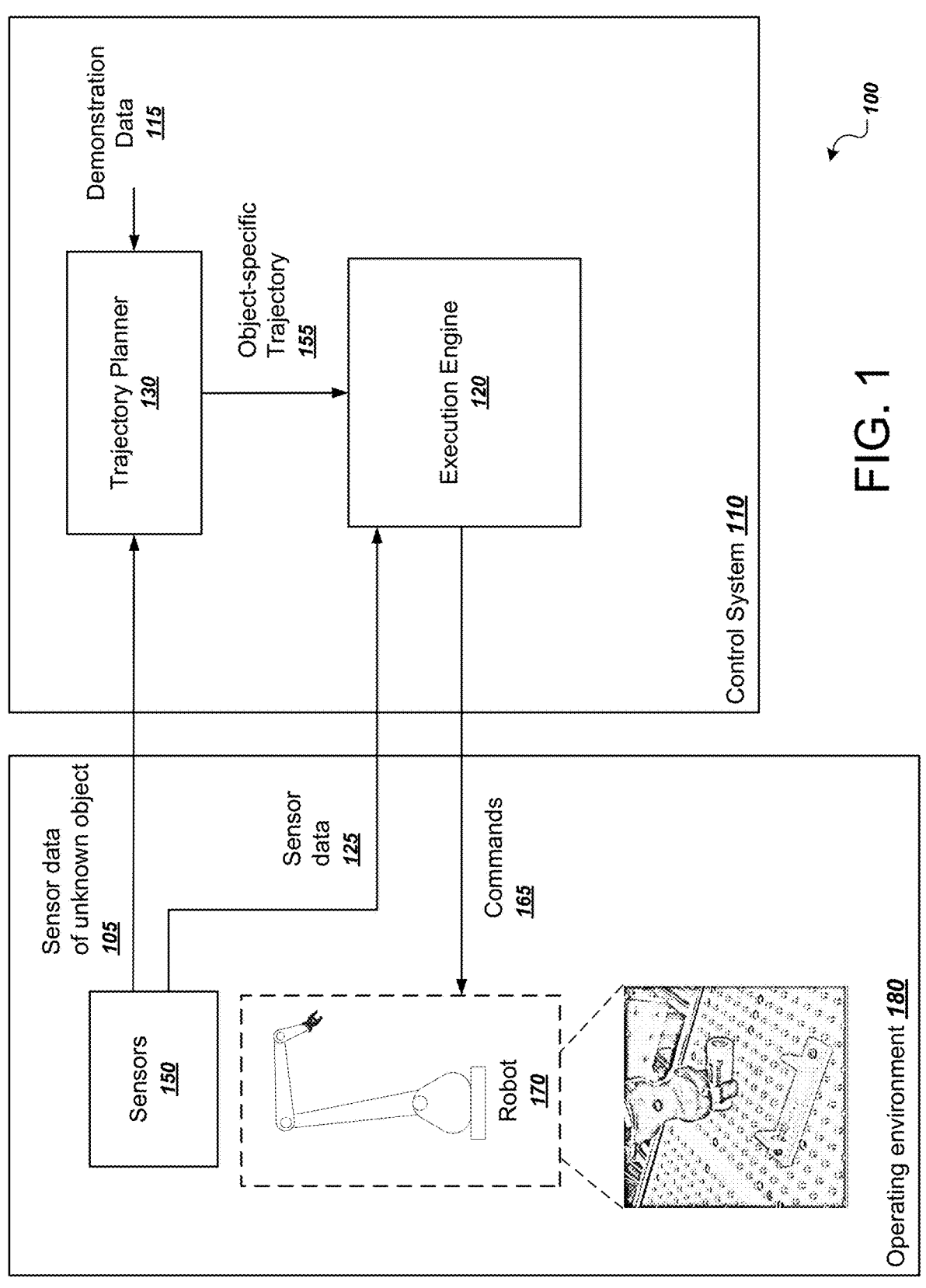
FIG. 1 is an diagram that illustrates an example system.

FIG. 1 is a diagram that illustrates an example system 100. The system 100 is an example of a robotics control system that can implement the robotic control techniques described in this specification. The system includes a control system 110 that operates to control a robot 170 in an operating environment 180.

The control system 100 includes a number of functional components, including a trajectory planner 130 and an execution engine 120. Each of these components can be implemented as computer programs installed on one or more computers in one or more locations that are coupled to each other through any appropriate communications network, e.g., an intranet or the Internet, or combination of networks.

The trajectory planner 130 is a computer-implemented subsystem that can take as input 1) sensor data 105 of an unknown object belonging to a particular object category, and 2) demonstration data 115 that demonstrates how to perform a particular manipulation task. The trajectory planner 130 can then generate an object-specific trajectory 155 that allows the control system 110 to control the robot 170 to perform the manipulation task on the unknown object. This process involves translating a demonstration trajectory captured from the demonstration data into a category-level representation of the trajectory. The category-level representation of the trajectory can then be cloned with the specifics of the unknown object in order to generate an object-specific trajectory that works for the unknown object.

The demonstration data can be any appropriate data representing a trajectory of a demonstration object. For example, the demonstration data can be a video that captures the trajectory of the demonstration object. Notably, the demonstration data need not be captured with an actual robot doing the manipulation. Instead, the demonstration can be performed by a human. For example, the demonstration data 115 can be a video of a human showing how to insert a demonstration battery into a receptacle. This can be rich enough data to generate the demonstration trajectory.

The sensor data 105 of the unknown object can be any appropriate sensor data representing at least a portion of the surface of the unknown object. For example, the sensor data 105 can be point cloud data, e.g., as captured from a 3D camera, lidar data, or a 3D representation of the object, e.g., captured from stereo cameras. Typically the sensor data 105*a* of the unknown object is incomplete. For example, the point cloud data of the unknown object might represent only the front surface of an object that is visible to the 3D camera.

The execution engine 120 uses the object-specific trajectory 155 generated by the trajectory planner 130 in order to provide commands 165 165 to the robot 170. In some implementations, the execution engine 120 consumes sensor data 125 generated by one or more sensors 150 in the operating environment 180 in order to adjust the object-specific trajectory in real time. For example, the execution engine can use a motion tracker to continually update the pose of the unknown object while performing the manipulation task.

The execution engine 120 can in some implementations be implemented using a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The trajectory planner 130 typically has no such or less stringent timing requirements. Typically the trajectory planner 130 operates to generate an object-specific trajectory 155, which is then executed by the execution engine 130 in real time.

In execution, the robot 170 can continually execute the commands 165 specified explicitly or implicitly by the execution engine 120 to perform the manipulation task. The robot 170 can be a real-time robot, which means that the robot 170 can be programmed to continually execute the commands 165 according to a highly constrained timeline. For example, the robot 170 can expect a command from the execution engine 120 at a particular frequency, e.g., 100 Hz or 1 kHz. If the robot 170 does not receive a command that is expected, the robot can enter a fault mode and stop operating.

Figure 2:
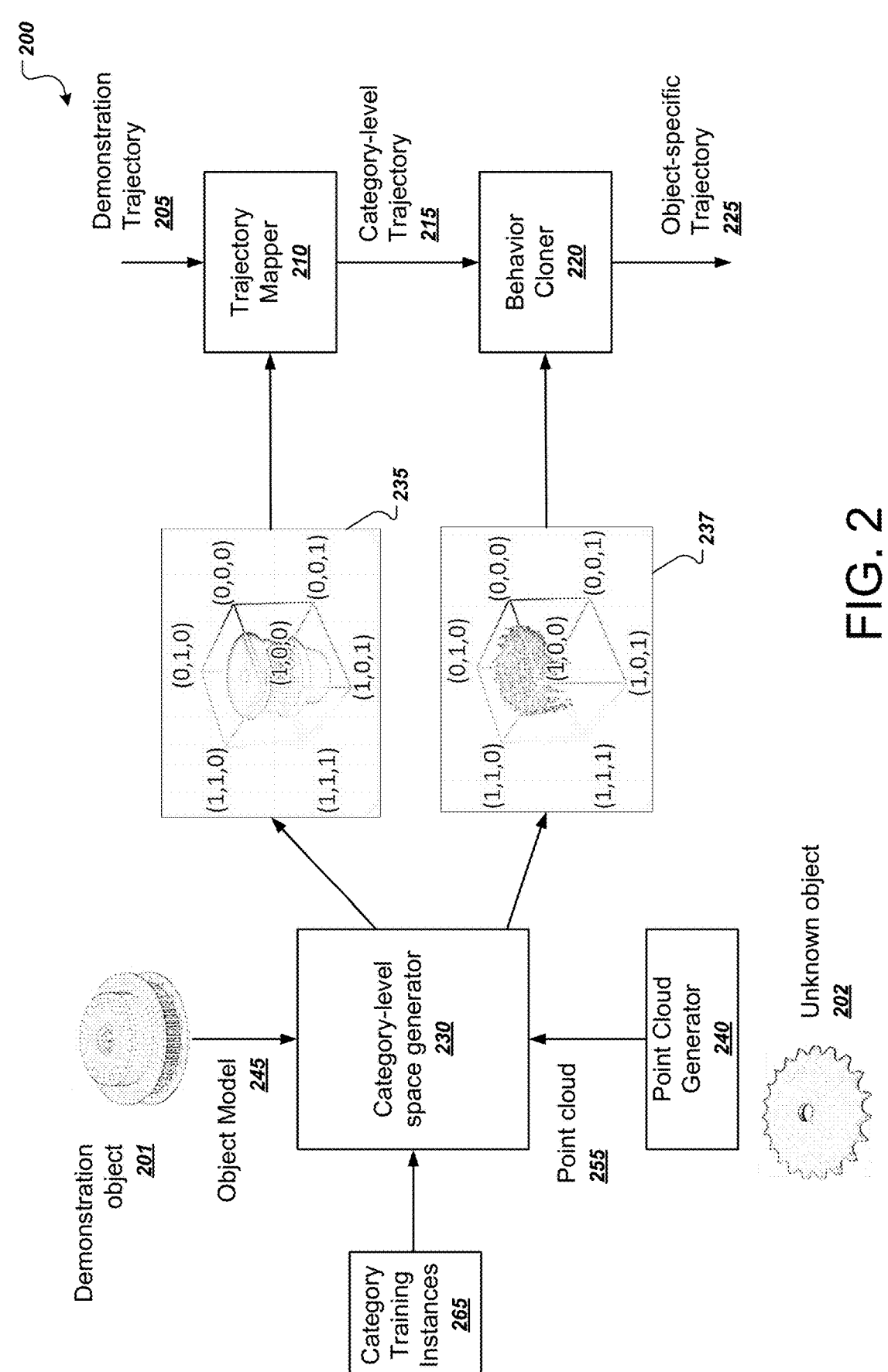
FIG. 2 is a list of example tasks and predicate values

FIG. 2 is a architecture diagram of a system 200 for category-level manipulation tasks. The system 200 is an example of a trajectory planner that can be used for category-level manipulation tasks. For example, the architecture of the system 200 can be used to implement the trajectory planner 130 of FIG. 1.

As shown in FIG. 2, the system 200 transforms a demonstration trajectory 205 into an object-specific trajectory 225 using a trajectory mapper 210 that maps the demonstration trajectory 205 into a category-level trajectory 215; and a behavior cloner 220 that maps the category-level trajectory 215 into the object-specific trajectory 225.

This process makes use of representations 235 and 237 of both a demonstration object 201 and the unknown object 202 to be manipulated. The representations 235 and 237 are representations in a category-level space previously learned by a category-level space generator 230 from category training instances 265. As mentioned above, the representation 237 of the unknown object 202 can be partial, whereas the representation 235 of the demonstration object 201 can be partial as well but might also be complete. For example, the representation 237 can be generated from a point cloud 255 generated by a point cloud generator 240, while the representation 235 can be generated from a fully specified object model 245, e.g., a CAD model of the demonstration object 201.

The demonstration trajectory 205 can be generated offline. For example, from a video of the demonstration, the object state in each demonstration video frame can be extracted via a model-free 6 Dof motion tracker. This allows the system 200 to represent the task demonstration with an extracted trajectory $\mathcal{T}_f^C := \{\xi_0, \xi_1, \ldots, \xi_t\}$, where $\xi \in SE(3)$ denotes the object pose at a given timestamp. It is noteworthy that the system can express the object poses in the receptacle's coordinate frame, e.g., a gear's pose relative to the shaft in the gear insertion task, which thus makes the process generalizable to arbitrary scene configurations regardless of their absolute poses in the world.

Given the demonstration object pose trajectory 205 parsed from the visual demonstration, the goal is to "reproject" this trajectory to other objects in the same category. To this end, the system 200 can use category-level behavior cloning (CatBC) that follows a virtual target pose trajectory tailored for a novel object O, reprojected from the demonstrated trajectory. Specifically, dense correspondence between $O_D$ and O can be established via their category-level canonical space representation, and consequently their relative transformation can be computed. Once the virtual target trajectory for object O is obtained, behavior cloning reduces to path following by comparing the tracked pose with the reference pose.

In some implementations, the original demonstration video can start before $O_D$ is grasped, as the initial image frame may be needed to estimate the category-level pose for the 6 Dof motion tracker initialization. However, in practice, the "last-inch" action sequence is most crucial regarding the manipulation task success. For example, once a gear is grasped without its hole being obstructed, in order to insert the gear onto the shaft, only the final clip of the demonstration when the gear is close to the shaft, encodes the most relevant spatial relation sequence between the gear and the shaft. Loosely speaking, this spatial relation sequence defines an effective manipulation policy leading to task success. Thus, the system can define a keypose as the pose that corresponds to the start of the last-portion of the demonstration trajectory, e.g., the last millimeter, centimeter, inch, or any other appropriate distance. The keypose thus also marks the beginning of the category-level behavior cloning process. During the testing stage, a robot path planner can be adopted to find a collision-free path that brings the in-hand object to the keypose, followed by the category-level behavior cloning process for the last-inch manipulation until task accomplishment.

The category-level space generator 230 is a machine learning model that can be trained offline from the category training instances 265. Given a single visual demonstration using a demonstration object $O_D$, in order to reproject its trajectory for task achievement with a novel object O during the testing stage, category-level data association between $O_D$ and O can be established. To do so, the system can establish a dense correspondence in a category-level space, which can be implemented using a "Non-Uniform Normalized Object Coordinate Space" (NUNOCS) to relate $O_D$ to an arbitrary object instance O in the same category.

Concretely, when the object shape is available, e.g., for the training objects, its NUNOCS representation can be obtained by normalizing the point cloud along each of the XYZ dimensions according to:

$$\mathcal{O}_C = (p - p_{min})/(p_{max} - p_{min}), \forall p \in P_O, \mathcal{O} \in \mathbb{O}_{train},$$

where $O_{train}$ represents object among the category training instances 206, and where p is a 3D point from the object point cloud, and where C denotes the canonical unit cube space which is shared among all objects within the same category. For an arbitrary unknown object O, if its NUNOCS representation is available, its relationship with the known object set $O_{train}$ can be established.

As mentioned above, during test time only a scanned partial point cloud of the unknown object available, preventing the above operation from being applied directly. Therefore, the system can train a neural network to learn the mapping, which takes as input the scanned partial point cloud of the object and predicts its point-wise location in the category-level space, e.g., a point-wise location in canonical unit cube space. While some previous approaches solely predicted the NUNOCS coordinates and relied on exhaustive RANSAC iterations to compute 9D poses (6D poses and 3D scales), it is often more efficient to attach another output branch to predict 3D non-uniform scales separately, i.e., $\Phi(P_O) = (P_C, s)$ where $s = (1, \alpha, \beta)^T \in R^3$. The 3D scales s can be normalized with respect to the first dimensions for compactness.

During online execution, the predicted non-uniform scaling can be first applied to the predicted NUNOCS coordinates as $s \circ P_C$. Subsequently, the 7D uniform scaled transformation between $s \circ P_C$ and Po can be solved in closed form using least-squares. Hence, the training loss is the weighted sum of the NUNOCS loss and the scaling loss, given by:

$$\mathcal{L} = \lambda_1 \mathcal{L}_{NUNOCS} + \lambda_2 \mathcal{L}_s,$$

$$\mathcal{L}_{NUNOCS} = \sum_{p \in P_O} \sum_{b \in B} -\overline{P}_C^{(p,b)} \log(P_C^{(p,b)}),$$

$$\mathcal{L}_s = \|s - \bar{s}\|_2,$$

where $\bar{s}$ and $\overline{P}_C$ are the ground-truth labels. $\lambda_1$ and $\lambda_2$ are the balancing weights and can be empirically set to 1 in experiments. The NUNOCS representation learning with $\mathcal{L}_{NUNOCS}$ can then be formulated as a classification problem by discretizing each coordinate dimension into B bins, e.g., B=10, 100, or 1000, to name just a few example for one-hot representations. This classification formulation with a cross-entropy loss has been found more effective than regression by reducing the continuous solution space to a finite number. To learn the non-uniform scale mapping, L2 loss can be applied.

The category-level space generator 230 can be trained solely with simulated data and can directly generalize to the real world without any retraining or fine-tuning. To achieve this, a synthetic training data generation process can be used, e.g., using PyBullet. For each training sample, an object can be randomly selected from the training set and dropped onto a table surface. After the object stabilizes, the partially scanned point cloud is computed from the rendered depth image. Additionally, the object's ground-truth pose is retrieved along with its CAD model, to compute the training labels $\bar{s}$ and $\overline{P}_C$. In order to bridge the sim-to-real domain gap, domain randomization can be employed by extensively randomizing the object instance types, physical parameters, object's initial poses, camera poses, and the table height. In addition, the bidirectional alignment technique over depth modality can be employed to reduce the discrepancy between the simulated and real world depth data.

This learning process dramatically reduces human effort by training solely with simulated data, in contrast to prior works that required large real world data and additional manual annotation of keypoints. Dense point-wise correspondence inherited from NUNOCS also circumvents the trouble of defining the number of semantic keypoints and their locations for each category or task.

The system can use motion tracking to augment the process in a number of ways. First, in the offline training stage, the system can use motion tracking to parse the recorded demonstration video to extract the 6 Dof motion trajectory of the manipulated object in the receptacle's coordinate frame. Compared to learning directly in the image pixel space, this disentangles the object of interest from the background and represents the extracted trajectory independent of any specific scene configuration. This enables the representation to generalize to novel environments, where the initial object and receptacle placement might differ from the demonstration.

Second, motion tracking can provide visual feedback for closed-loop online execution when manipulating a testing object. Dynamics uncertainties are often unavoidable in manipulation tasks, such as unsynchronized finger touching from object sides during grasping, in-hand object slipping during transporting, and in-hand object motion caused by rich contact with the receptacle during last inch manipulation. In the context of high-precision manipulation tasks, such uncertainties can introduce non-negligible error and disturb the target's following the nominal trajectory. To address this issue, the system can leverage an RGBD-based 6 Dof object motion tracker, e.g., BundleTrack as described in B Wen and Kostas E Bekris, *BundleTrack: 6D Pose Tracking for Novel Objects without Instance or Category-Level 3D Models*, in the IEEE/RSJ International Conference on Intelligent Robots and Systems (2021). The 6 Dof motion tracked online can provide near real-time feedback to guide the execution by comparing the estimated object pose at each timestamp against the demonstrated nominal trajectory. Alternative 6 Dof object motion tracking methods rely on object CAD models, which can impedes instant deployment to novel objects.

Once a demonstration object pose trajectory is obtained, e.g., by video parsing, canonicalization in the category-level space (Sec. IV-B) allows the system to establish dense correspondence between the demonstration object $O_D$ and a testing object O. This process effectively "reprojects" the actual demonstration trajectory to a virtual target trajectory tailored for O, to replay the sequential actions accomplishing the task. More specifically, even when there is no prior knowledge about the novel object O, strictly following the virtual target trajectory can result in task success. This is because by virtual trajectory following, the novel object O traverses the critical task-relevant path relative to the receptacle in a desired sequence.

This approach will be referred to as category-level behavior cloning (CatBC). CatBC realizes a manipulation policy by object pose trajectory following, which is object-centric and agnostic to how the object is grasped by the robot. To robustify CatBC against dynamics uncertainties, online object pose estimation can be used to ensure that the object stays on the nominal path. This is in contrast to prior approaches, which treated the grasped object as an extended kinematic frame and which were ineffective and brittle as shown in actual experiments.

TABLE 1 outlines the Category-Level Behavior Cloning (CatBC) process.

| 1 | Input: tracker, robot, $\mathcal{J}$ |
| | // virtual target trajectory |
| | // starting from keypose |
| | for $\xi_i$ in $\mathcal{J}$ do |
| | // perform visual servoing in SE(3) |
| 2 | // object SE(3) pose |
| | $\xi \leftarrow$ tracker.get_pose( ) |
| 3 | // relative pose |
| | $\Delta\xi \leftarrow \xi_i \ominus \xi$ |
| 4 | // get joint configuration |
| | $q \leftarrow$ robot.get_joints( ) |
| 5 | // get Jacobian matrix |
| | $J \leftarrow$ robot.get_jacobian(q) |
| 6 | // perform Jacobian steering |
| | $\Delta q \leftarrow J^\dagger \Delta\xi$ |
| 7 | $q' \leftarrow q + \Delta q$ |
| 8 | // move joints |
| | robot.reach(q') |
| 9 | end |

A model-free 6 Dof object motion tracker can provide online visual feedback for closed-loop control. In free space, given a target pose $\xi_i$ along the trajectory J, an open-loop execution of a motion command would precisely bring the actual object pose $\xi$ to $\xi_i$. However, in last-inch manipulation, dynamics uncertainties arising from contacts and robot-object-receptacle interaction can invalidate this simple but limited option. It is thus often beneficial to perform closed-loop visual servoing in SE(3) to ensure the virtual target trajectory is followed to the highest degree, as reflected in lines 2 to 8 in the algorithm shown in TABLE 1.

Traditional 6D object poses represent the object state with a predefined local coordinate system and aim to find the transformation to the task-relevant target frame. At the instance level, given an object 6D pose and the 3D model, any point on the rigid object is always uniquely defined in the local coordinate frame. This allows implicitly defining the object's different parts and orientations relevant to a specific task.

However, it is challenging to adopt one constant category-level canonical coordinate frame for different tasks while capturing the geometric variation across object instances. Taking battery insertion as an example, if a system uses the commonly selected center-of-mass as the canonical coordinate frame origin, when aligning a novel battery instance to the demonstrated one, it may collide with or float away from the receptacle, depending on its particular larger or smaller diameter. In addition, the optimal location can change for different tasks. For example, the bottom corner of the battery is more appropriate as the frame origin for the battery standing task, while the bottom edge is more appropriate as the frame origin for the battery assembly task (in contact with both the receptacle and the spring). And it is cumbersome to manually specify a suitable local coordinate frame for each task. Moreover, the task-relevant local coordinate frame may not stay constant throughout a complex manipulation task.

Instead, the system can use a local attention mechanism to automatically and dynamically select an anchor point $p^*_\tau$ that defines the origin of the category-level canonical coordinate system. Concretely, during offline learning, a signed distance function to the receptacle is computed, denoted by $\Omega(\bullet)$. Then, an attention heatmap and the anchor point at any timestamp along the manipulation horizon can be computed according to:

$$Attn_\tau(p_i) = 1 - \frac{\exp(\Omega(\xi_\tau p_i))}{\sum_j \exp(\Omega(\xi_\tau p_j))},$$

$$p_\tau^* = \operatorname*{argmax}_{p_i} Attn_\tau(p_i),$$

where $p_i$ are the points on the 3D model of the demonstration object $O_D$. $\xi_\tau$ denotes the demonstration object's pose relative to the receptacle along the trajectory:

$$\mathcal{T}_f^C := \{\xi_0, \xi_1, \dots, \xi_t\},$$

which is parsed from the demonstration video. Intuitively, the local object part that is closer to the receptacle should be assigned with higher attention. During testing, however, the novel object's shape is not available to directly compute the attention heatmap. By virtue of the established dense correspondence using the category-level space, e.g., NUNOCS, the attention heatmap can be transferred from $O_D$ to novel objects.

Such an attention mechanism allows the system to dynamically anchor the coordinate system to the local attended point, capturing the variation between demonstration and testing objects in scaling and local typology. The coordinate system is only translated to attend to the task-relevant local region, while the orientation remains the same as the original learned category-level canonical frame.

Figure 3:
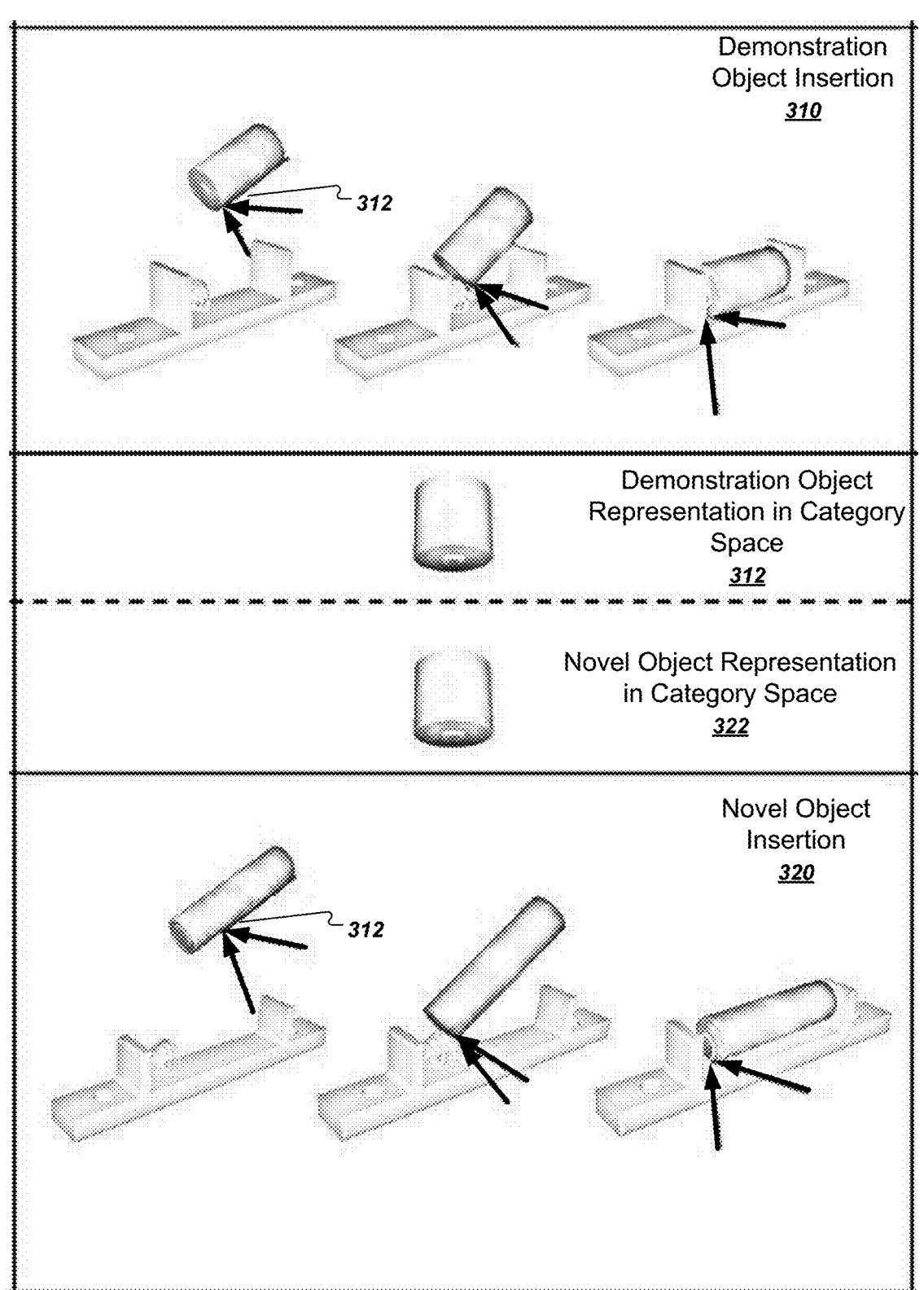
FIG. 3 is an example flowchart showing representative method steps.

FIG. 3 illustrates a local attention mechanism for objects having different sizes. The first sequence pane 310 illustrates a demonstration of a demonstration object, in this case a battery, into a receptacle. The demonstration 310 can for example be performed by a human or a robot and captured by a video camera.

During the demonstration, the system can continually compute the anchor point 312, which is indicated by arrows.

The second sequence pane 320 illustrates the same task being performed on a novel object. In this case, the novel object is thinner along its axis than the demonstration object. For example, the demonstration object might be a C battery, while the novel object might be a AA battery.

Notably, the representation of the novel object in category space 322 is extremely similar to the representation of the demonstration object in category space 312. Thus, when the system performs the local attention mechanism for the novel object, it will orient the process around an anchor point 312 on the novel object that corresponds to the anchor point 312 on the demonstration object.

Compared to using a small number of pre-specified keypoints in previous works, this dynamic attention mechanism approach yields versatile implicit keypoints augmented with orientation information, which can self-adjust along the manipulation horizon. This improves expressiveness, reduces human efforts, and enables high precision category-level behavior cloning.

The proposed framework is not constrained to a particular grasp planning approach and in general, any CAD model-free grasping planning method can be adopted. As long as the grasp complies with the downstream manipulation task, as in the considered setup, task-relevant grasp planning can be adopted. The core idea is to utilize the category-level affordance priors unified by NUNOCS representations to propose and select task-relevant grasps.

The proposed framework is robust to uncertainty due to robot-object interactions, such as the object moving during finger closing. This is achieved due to the online object state update from the 6 DoF tracker. Once the object is grasped, the tracker provides the latest in-hand object pose, which serves as the start pose for a path planner (RRT* in the implementation) to find a collision-free path that transports the object to the keypose. The decomposition into long-range, collision-free motion to bring the object to the key-pose, and then, lastinch manipulation, provides an implicit attention mechanism that ignores the unimportant background information in the demonstration. It focuses on the critical actions that define task accomplishment. The long-range collision-aware path planning also ensures safety when applying the framework to new scenes with novel obstacles.

FIG. 4 is a flowchart of an example process for using a demonstration to teach a robot how to manipulate all objects in a category. The example process can be performed by a system of one or more computers in one or more locations programmed in accordance with this specification, e.g., the system 100 of FIG. 1. The example process will be described as being performed by a system of one or more computers.

The system obtains demonstration data for a manipulation task on a demonstration object (410). For example, the demonstration data can be video data of a human or a robot performing the manipulation task with a demonstration object belonging to an object category.

The system generates a category-level trajectory from the demonstration data (420). The system can for example parse the video data from the demonstration to generate a trajectory in category-level space. As described above, this can involve transformation a representation of the demonstration object to a category-level space that was learned from many instances of objects belonging to the same category.

The system receives data representing a new object (430). The new object can be an object in the same category as the demonstration object. As described above, the system need not have complete information representing the new object, and in some cases may have only partial data, e.g., partial point cloud data, of parts of the object that are visible from a sensor.

The system generates a trajectory projection of the cat-egory-level trajectory for the new object (440). This process transforms the trajectory in the category-level space to a trajectory that is specific to the properties of the new object.

The system performs the manipulation task on the new object using the trajectory projection (450). The system can repeat the manipulation task that was the subject of the demonstration task on the new object by using the trajectory transformed through the category-level space. Moreover, the system repeat the manipulation task on any novel object belonging to the same category, even when the novel object has never been seen before.

In this way, the system is able to use a single demonstration for one object in a category in order to teach a robotic system how to perform the same manipulation task for all objects belonging to the category. This process provides a robust, efficient, and highly reliable technique for teaching robots to perform manipulation tasks with high accuracy.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above and the attached embodiments, the following embodiments are also innovative:

Embodiment 1 is a method performed by one or more computers, the method comprising:

obtaining demonstration data representing a trajectory of a demonstration object while a manipulation task is performed on the demonstration object;

generating a category-level trajectory from the demonstration data;

receiving data representing a new object belonging to the object category;

generating a trajectory projection of the category-level trajectory according to the representation of the new instance of the object category in the category-level space; and using the trajectory projection to cause a robot to perform the manipulation task using the new object belonging to the object category.

Embodiment 2 is the method of embodiment 1, further comprising:

obtaining a collection of object models for a plurality of different types of objects belonging to a same object category;

training a neural network to generate category-level representations in a category-level space from the collection of object models.

Embodiment 3 is the method of embodiment 2, wherein training the network from the collection of object models comprises generating a non-uniform, normalized representation space and normalizing a point cloud representation of each object model along one or more dimensions.

Embodiment 4 is the method of any one of embodiments 2-3, further comprising training the neural network to learn a mapping between partial point cloud representations of the object models and the category-level representation in a category-level space, wherein the neural network generates a prediction of points in the category-level space.

Embodiment 5 is the method of embodiment 4, wherein training the neural network comprises performing a training process entirely in simulation.

Embodiment 6 is the method of embodiment 5, wherein training the neural network does not require gathering any real-world data or human annotated keypoints.

Embodiment 7 is the method of any one of embodiments 1-6, wherein the category-level trajectory is an object-centric trajectory representing a trajectory of an object.

Embodiment 8 is the method of embodiment 7, wherein the category-level trajectory is agnostic to how the object is held by a robot.

Embodiment 9 is the method of any one of embodiments 1-8, wherein obtaining the demonstration data comprises obtaining video data of the demonstration object.

Embodiment 10 is the method of embodiment 9, further comprising processing the video data to generate a sequence of partial point clouds of the demonstration object.

Embodiment 11 is the method of embodiment 10, further comprising mapping the sequence of partial point clouds to the category-level space.

Embodiment 12 is the method of any one of embodiments 1-11, wherein the collection of object models comprises a plurality of CAD models of objects belonging to the same category.

Embodiment 13 is the method of any one of embodiments 1-12, wherein the category-level representation is generated from multiple different instances of objects belonging to the category.

Embodiment 14 is the method of any one of embodiments 1-13, wherein the new object is an object that has never been seen by the system.

Embodiment 15 is the method of any one of embodiments 1-14, wherein performing the robotic skill on the new object belonging to the object category does not require retraining a model or acquiring additional training data.

Embodiment 16 is the method of any one of embodiments 1-15, wherein performing the robotic skill on the new object comprises performing object tracking to continuously adjust an actual trajectory of the new object to a nominal trajectory.

Embodiment 17 is the method of any one of embodiments 1-16, wherein performing the robotic skill on the new object is robust to unplanned robot-object interactions.

Embodiment 18 is the method of any one of embodiments 1-17, wherein the manipulation skill is a modular skill having a motion portion and a manipulation portion.

Embodiment 19 is the method of embodiment 18, wherein the motion portion of the skill positions the new object at a keypose that starts the manipulation portion of the skill.

Embodiment 20 is the method of embodiment 19, wherein the manipulation portion of the skill causes the robot to follow the trajectory projection for the new object.

Embodiment 21 is the method of embodiment 18, wherein the manipulation portion of the skill uses object tracked behavior cloning.

Embodiment 22 is the method of embodiment 21, wherein the motion portion of the skill uses path planning.

Embodiment 23 is the method of embodiment 22, wherein the manipulation skill does not use reinforcement learning.

Embodiment 24 is a system comprising: one or more computers and one or more storage devices storing instructions that are operable, when executed by the one or more computers, to cause the one or more computers to perform the method of any one of embodiments 1 to 23.

Embodiment 25 is a computer storage medium encoded with a computer program, the program comprising instructions that are operable, when executed by data processing apparatus, to cause the data processing apparatus to perform the method of any one of embodiments 1 to 23.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method performed by one or more computers, the method comprising:

obtaining demonstration data representing a trajectory of a demonstration object while a manipulation task is performed on the demonstration object;

generating a category-level trajectory from the demonstration data, including generating a sequence of poses of the demonstration object relative to a reference point in an environment of the demonstration object;

generating, for each of the sequence of poses, a respective corresponding attention heatmap and an anchor point defining an origin of a category-level coordinate system;

receiving data representing a new object belonging to the object category;

generating a trajectory projection of the category-level trajectory according to the representation of the new instance of the object category in the category-level space by training a neural network to learn a mapping between a partial point cloud representation of the new object and a category-level representation of object models of the object category in the category-level space, wherein the neural network generates a location of the new object in the category-level space from the partial point cloud representation and wherein generating the trajectory projection further comprises, after learning the mapping:

transferring the attention heatmap to the partial point cloud representation of the new object; and determining, from the attention heatmap, an anchor point for the new object to align the coordinate frame of the new object with the category-level coordinate system for the trajectory projection;

using the trajectory projection to cause a robot to perform the manipulation task using the new object belonging to the object category.

2. The method of claim 1, further comprising:

obtaining a collection of object models for a plurality of different types of objects belonging to a same object category;

training a neural network to generate category-level representations in a category-level space from the collection of object models.

3. The method of claim 2, wherein training the network from the collection of object models comprises generating a non-uniform, normalized representation space and normalizing a point cloud representation of each object model along one or more dimensions.

4. The method of claim 1, wherein training the neural network comprises performing a training process entirely in simulation.

5. The method of claim 4, wherein training the neural network does not require gathering any real-world data or human annotated keypoints.

6. The method of claim 1, wherein the category-level trajectory is an object-centric trajectory representing a trajectory of an object.

7. The method of claim 6, wherein the category-level trajectory is agnostic to how the object is held by a robot.

8. The method of claim 1, wherein obtaining the demonstration data comprises obtaining video data of the demonstration object.

9. The method of claim 8, further comprising processing the video data to generate a sequence of partial point clouds of the demonstration object.

10. The method of claim 9, further comprising mapping the sequence of partial point clouds to the category-level space.

11. The method of claim 1, wherein the collection of object models comprises a plurality of CAD models of objects belonging to the same category.

12. The method of claim 1, wherein the category-level representation is generated from multiple different instances of objects belonging to the category.

13. The method of claim 1, wherein the new object is an object that has never been seen by the system.

14. The method of claim 1, wherein performing the robotic skill on the new object belonging to the object category does not require retraining a model or acquiring additional training data.

15. A system comprising:

one or more computers and one or more storage devices storing instructions that are operable, when executed by the one or more computers, to cause the one or more computers to perform operations comprising:

obtaining demonstration data representing a trajectory of a demonstration object while a manipulation task is performed on the demonstration object;

generating a category-level trajectory from the demonstration data, including generating a sequence of poses of the demonstration object relative to a reference point in the environment of the demonstration object;

generating, for each of the sequence of poses, a respective corresponding attention heatmap and an anchor point defining an origin of a category-level coordinate system;

receiving data representing a new object belonging to the object category;

generating a trajectory projection of the category-level trajectory according to the representation of the new instance of the object category in the category-level space by training a neural network to learn a mapping between a partial point cloud representation of the new object and a category-level representation of object models of the object category in the category-level space, wherein the neural network generates a location of the new object in the category-level space from the partial point cloud representation and wherein generating the trajectory projection further comprises, after learning the mapping:

transferring the attention heatmap to the partial point cloud representation of the new object; and determining, from the attention heatmap, an anchor point for the new object to align the coordinate frame of the new object with the category-level coordinate system for the trajectory projection;

using the trajectory projection to cause a robot to perform the manipulation task using the new object belonging to the object category.

16. The system of claim 15, wherein the operations further comprise:

obtaining a collection of object models for a plurality of different types of objects belonging to a same object category;

training a neural network to generate category-level representations in a category-level space from the collection of object models.

17. The system of claim 16, wherein training the network from the collection of object models comprises generating a non-uniform, normalized representation space and normalizing a point cloud representation of each object model along one or more dimensions.

18. The system of claim 16, wherein the operations further comprise training the neural network to learn a mapping between partial point cloud representations of the object models and the category-level representation in a category-level space, wherein the neural network generates a prediction of points in the category-level space.

19. One or more non-transitory computer storage media encoded with computer program instructions that when executed by one or more computers cause the one or more computers to perform operations comprising:

obtaining demonstration data representing a trajectory of a demonstration object while a manipulation task is performed on the demonstration object;

generating a category-level trajectory from the demonstration data, including generating a sequence of poses of the demonstration object relative to a reference point in the environment of the demonstration object;

generating, for each of the sequence of poses, a respective corresponding attention heatmap and an anchor point defining an origin of a category-level coordinate system;

receiving data representing a new object belonging to the object category;

generating a trajectory projection of the category-level trajectory according to the representation of the new instance of the object category in the category-level space by training a neural network to learn a mapping between a partial point cloud representation of the new object and a category-level representation of object models of the object category in the category-level space, wherein the neural network generates a location of the new object in the category-level space from the partial point cloud representation and wherein generating the trajectory projection further comprises, after learning the mapping:

transferring the attention heatmap to the partial point cloud representation of the new object; and determining, from the attention heatmap, an anchor point for the new object to align the coordinate frame of the new object with the category-level coordinate system for the trajectory projection;

using the trajectory projection to cause a robot to perform the manipulation task using the new object belonging to the object category.

* * * * *